(12) United States Patent
Zhang et al.

(10) Patent No.: US 12,144,048 B2
(45) Date of Patent: *Nov. 12, 2024

(54) SECONDARY CELL LINK RECOVERY REQUEST TRANSMISSION

(71) Applicant: Apple Inc., Cupertino, CA (US)

(72) Inventors: Yushu Zhang, Beijing (CN); Dawei Zhang, Saratoga, CA (US); Haijing Hu, Los Gatos, CA (US); Haitong Sun, Cupertino, CA (US); Hong He, Cupertino, CA (US); Wei Zeng, Saratoga, CA (US); Yakun Sun, San Jose, CA (US); Yuchul Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,601

(22) Filed: Jul. 29, 2022

(65) Prior Publication Data
US 2022/0386405 A1    Dec. 1, 2022

Related U.S. Application Data

(63) Continuation of application No. 16/931,254, filed on Jul. 16, 2020, now Pat. No. 11,445,563.

(30) Foreign Application Priority Data

Sep. 27, 2019  (CN) ......................... 201910920468.5

(51) Int. Cl.
H04W 76/19    (2018.01)
H04W 8/24     (2009.01)
(Continued)

(52) U.S. Cl.
CPC ............. *H04W 76/18* (2018.02); *H04W 8/24* (2013.01); *H04W 72/1268* (2013.01);
(Continued)

(58) Field of Classification Search
CPC . H04W 76/18; H04W 76/19; H04W 72/1268; H04W 74/0833; H04W 8/24; H04W 72/14
See application file for complete search history.

(56) References Cited

U.S. PATENT DOCUMENTS 9,125,218 B2 *  9/2015  Chang ............... H04W 74/0833
9,420,627 B2    8/2016  Yiu et al.
(Continued)

FOREIGN PATENT DOCUMENTS

EP    3735036 A1 * 11/2020 ........... H04B 7/0695
WO    2019174036 A1    9/2019

OTHER PUBLICATIONS

Extended European Search Report for EP Application No. 20195280, dated Jan. 28, 2021, 10 pages.
(Continued)

Primary Examiner — Parth Patel
(74) Attorney, Agent, or Firm — Kowert, Hood, Munyon, Rankin & Goetzel, P.C.

(57) ABSTRACT

Embodiments are presented herein of apparatuses, systems, and methods for a user equipment device (UE) to transmit an indication of a link failure on a secondary cell. The indication may be transmitted on resources selected based on one or more conditions. One or more priority rules may be used to resolve collisions. The UE may further make an assumption of a beam or beams to use for communications with the secondary cell following the link failure and prior to receiving an indication from the network of a selected beam.

20 Claims, 11 Drawing Sheets

(51) Int. Cl.
*H04W 72/1268* (2023.01)
*H04W 72/23* (2023.01)
*H04W 74/0833* (2024.01)
*H04W 76/18* (2018.01)

(52) U.S. Cl.
CPC ....... *H04W 72/23* (2023.01); *H04W 74/0833* (2013.01); *H04W 76/19* (2018.02)

(56) References Cited

U.S. PATENT DOCUMENTS

| | | | | |
|---|---|---|---|---|
| 9,451,652 | B2* | 9/2016 | Gohari | H04W 52/0238 |
| 9,736,795 | B2* | 8/2017 | Dinan | H04B 7/2618 |
| 9,900,891 | B1* | 2/2018 | Islam | H04W 36/0079 |
| 9,949,298 | B1* | 4/2018 | Akoum | H04B 7/0695 |
| 10,271,232 | B2 | 4/2019 | Marinier et al. | |
| 11,039,350 | B2* | 6/2021 | Cirik | H04W 36/0069 |
| 11,095,355 | B2* | 8/2021 | Cirik | H04W 74/0833 |
| 11,122,606 | B2* | 9/2021 | Quan | H04W 72/21 |
| 11,129,070 | B2* | 9/2021 | Park | H04W 16/28 |
| 11,139,881 | B2 | 10/2021 | Harada et al. | |
| 2014/0307694 | A1* | 10/2014 | Zeng | H04L 5/0053 370/329 |
| 2015/0208462 | A1* | 7/2015 | Lee | H04W 72/23 370/311 |
| 2015/0289251 | A1* | 10/2015 | Koc | H04W 72/23 370/311 |
| 2015/0365921 | A1* | 12/2015 | Wu | H04L 5/0092 370/329 |
| 2016/0174170 | A1* | 6/2016 | Yang | H04W 52/367 370/329 |
| 2017/0013565 | A1* | 1/2017 | Pelletier | H04W 52/367 |
| 2017/0195998 | A1* | 7/2017 | Zhang | H04W 52/365 |
| 2017/0207843 | A1* | 7/2017 | Jung | H04W 74/006 |
| 2017/0290015 | A1* | 10/2017 | Xu | H04W 72/0453 |
| 2017/0332406 | A1* | 11/2017 | Islam | H04W 74/0833 |
| 2017/0339662 | A1* | 11/2017 | Lin | H04W 72/0446 |
| 2017/0373731 | A1* | 12/2017 | Guo | H04B 7/0404 |
| 2018/0006770 | A1* | 1/2018 | Guo | H04L 1/1896 |
| 2018/0054832 | A1* | 2/2018 | Luo | H04W 52/54 |
| 2018/0083753 | A1* | 3/2018 | Nagaraja | H04B 7/0695 |
| 2018/0098334 | A1* | 4/2018 | Tie | H04W 72/12 |
| 2018/0110066 | A1* | 4/2018 | Luo | H04W 72/1268 |
| 2018/0115990 | A1* | 4/2018 | Abedini | H04L 5/0094 |
| 2018/0124687 | A1* | 5/2018 | Park | H04W 48/12 |
| 2018/0132266 | A1* | 5/2018 | Chen | H04L 47/522 |
| 2018/0138962 | A1* | 5/2018 | Islam | H04B 7/0695 |
| 2018/0176958 | A1* | 6/2018 | Islam | H04W 74/0833 |
| 2018/0191422 | A1* | 7/2018 | Xia | H04B 7/061 |
| 2018/0219604 | A1* | 8/2018 | Lu | H04B 7/088 |
| 2018/0220448 | A1* | 8/2018 | Akkarakaran | H04L 5/0023 |
| 2018/0227899 | A1* | 8/2018 | Yu | H04W 74/08 |
| 2018/0234960 | A1* | 8/2018 | Nagaraja | H04W 36/0055 |
| 2018/0241452 | A1* | 8/2018 | Akkarakaran | H04W 72/0446 |
| 2018/0249453 | A1* | 8/2018 | Nagaraja | H04B 7/0632 |
| 2018/0270698 | A1* | 9/2018 | Babaei | H04W 72/21 |
| 2018/0270699 | A1* | 9/2018 | Babaei | H04W 28/0278 |
| 2018/0270700 | A1* | 9/2018 | Babaei | H04W 28/0278 |
| 2018/0278310 | A1* | 9/2018 | Lee | H04B 7/0632 |
| 2018/0278357 | A1* | 9/2018 | Kim | H04J 11/0076 |
| 2018/0279150 | A1* | 9/2018 | He | H04W 72/23 |
| 2018/0279193 | A1* | 9/2018 | Park | H04W 36/30 |
| 2018/0279229 | A1* | 9/2018 | Dinan | H04W 74/0833 |
| 2018/0288756 | A1* | 10/2018 | Xia | H04W 74/006 |
| 2018/0302889 | A1* | 10/2018 | Guo | H04L 5/0085 |
| 2018/0310321 | A1* | 10/2018 | Basu Mallick | H04L 47/2425 |
| 2018/0317123 | A1* | 11/2018 | Chen | H04W 72/21 |
| 2018/0323856 | A1* | 11/2018 | Xiong | H04W 72/23 |
| 2018/0324723 | A1* | 11/2018 | Akkarakaran | H04W 56/001 |
| 2018/0324867 | A1* | 11/2018 | Basu Mallick | H04W 72/569 |
| 2018/0343653 | A1* | 11/2018 | Guo | H04W 72/542 |
| 2018/0351611 | A1* | 12/2018 | Nagaraja | H04W 56/0095 |
| 2018/0367374 | A1* | 12/2018 | Liu | H04W 76/18 |
| 2018/0368126 | A1* | 12/2018 | Islam | H04L 5/1469 |
| 2018/0368142 | A1* | 12/2018 | Liou | H04W 74/0808 |
| 2019/0028174 | A1* | 1/2019 | Chakraborty | H04B 7/088 |
| 2019/0037423 | A1* | 1/2019 | Yu | H04B 7/0695 |
| 2019/0037498 | A1* | 1/2019 | Tseng | H04W 72/046 |
| 2019/0059129 | A1* | 2/2019 | Luo | H04B 7/0695 |
| 2019/0074882 | A1* | 3/2019 | Zhou | H04L 5/005 |
| 2019/0098520 | A1 | 3/2019 | Kim | |
| 2019/0104507 | A1* | 4/2019 | Majmundar | H04W 36/0069 |
| 2019/0173740 | A1* | 6/2019 | Zhang | H04L 41/0677 |
| 2019/0174385 | A1 | 6/2019 | Sang et al. | |
| 2019/0190582 | A1* | 6/2019 | Guo | H04L 1/0061 |
| 2019/0200248 | A1* | 6/2019 | Basu Mallick | H04B 7/088 |
| 2019/0200249 | A1* | 6/2019 | Yoon | H04L 5/0057 |
| 2019/0230529 | A1* | 7/2019 | Sadiq | H04W 24/04 |
| 2019/0268893 | A1* | 8/2019 | Tsai | H04W 16/28 |
| 2019/0281535 | A1* | 9/2019 | Wei | H04W 48/12 |
| 2019/0305899 | A1* | 10/2019 | Rico Alvarino | H04L 1/203 |
| 2019/0320396 | A1* | 10/2019 | Bagheri | H04W 52/34 |
| 2019/0349832 | A1* | 11/2019 | Lee | H04B 7/0695 |
| 2019/0357291 | A1* | 11/2019 | Zhou | H04W 72/23 |
| 2019/0387420 | A1* | 12/2019 | Li | H04W 76/18 |
| 2020/0053826 | A1* | 2/2020 | Shi | H04W 24/00 |
| 2020/0145079 | A1* | 5/2020 | Marinier | H04B 7/0695 |
| 2020/0154449 | A1* | 5/2020 | Akkarakaran | H04W 72/56 |
| 2020/0170065 | A1* | 5/2020 | Xue | H04W 72/23 |
| 2020/0228185 | A1* | 7/2020 | Tao | H04B 7/0695 |
| 2020/0260300 | A1* | 8/2020 | Cirik | H04L 5/0048 |
| 2020/0281012 | A1* | 9/2020 | Behravan | H04L 47/245 |
| 2020/0314941 | A1* | 10/2020 | Bai | H04B 7/022 |
| 2020/0314942 | A1* | 10/2020 | Bai | H04W 80/02 |
| 2020/0328798 | A1* | 10/2020 | Huang | H04W 16/28 |
| 2020/0344019 | A1* | 10/2020 | Da Silva | H04L 1/203 |
| 2020/0344621 | A1* | 10/2020 | Xu | H04W 28/0278 |
| 2020/0350972 | A1* | 11/2020 | Yi | H04L 1/12 |
| 2020/0350973 | A1* | 11/2020 | Cirik | H04B 7/0695 |
| 2020/0351730 | A1* | 11/2020 | Park | H04W 36/0072 |
| 2020/0367309 | A1* | 11/2020 | Yang | H04W 80/02 |
| 2020/0383167 | A1 | 12/2020 | Sengupta et al. | |
| 2020/0403682 | A1 | 12/2020 | Koskela et al. | |
| 2020/0404638 | A1* | 12/2020 | Deogun | H04L 5/0091 |
| 2021/0013949 | A1 | 1/2021 | Agiwal et al. | |
| 2021/0028848 | A1* | 1/2021 | Tsai | H04B 7/088 |
| 2021/0029724 | A1* | 1/2021 | Tsai | H04W 72/046 |
| 2021/0036757 | A1* | 2/2021 | Yu | H04L 1/1819 |
| 2021/0050901 | A1* | 2/2021 | Chin | H04W 80/02 |
| 2021/0050968 | A1* | 2/2021 | Yi | H04L 5/0048 |
| 2021/0058130 | A1* | 2/2021 | Zhu | H04W 74/0833 |
| 2021/0058998 | A1* | 2/2021 | Yuan | H04B 7/0617 |
| 2021/0068188 | A1* | 3/2021 | Ryu | H04L 5/0048 |
| 2021/0092625 | A1* | 3/2021 | Wang | H04B 7/0632 |
| 2021/0092733 | A1* | 3/2021 | Bai | H04B 7/0695 |
| 2021/0099263 | A1* | 4/2021 | Cheng | H04L 5/0048 |
| 2021/0100030 | A1* | 4/2021 | Myung | H04W 74/0833 |
| 2021/0100056 | A1* | 4/2021 | Zhang | H04W 74/0833 |
| 2021/0218453 | A1* | 7/2021 | Song | H04L 5/0091 |
| 2021/0218457 | A1* | 7/2021 | Xu | H04B 7/088 |
| 2021/0282168 | A1* | 9/2021 | Matsumura | H04L 5/0048 |
| 2021/0337453 | A1* | 10/2021 | Gao | H04B 7/0695 |
| 2021/0376909 | A1* | 12/2021 | Khoshnevisan | H04W 76/19 |
| 2021/0409091 | A1 | 12/2021 | Svedman et al. | |
| 2021/0409096 | A1* | 12/2021 | Liou | H04W 56/001 |
| 2022/0052749 | A1* | 2/2022 | Guo | H04L 5/0051 |
| 2022/0061087 | A1* | 2/2022 | Koskela | H04W 72/02 |
| 2022/0061117 | A1* | 2/2022 | Liou | H04W 76/19 |
| 2022/0311498 | A1* | 9/2022 | Loehr | H04W 72/23 |
| 2022/0386405 | A1* | 12/2022 | Zhang | H04W 72/23 |
| 2022/0416870 | A1* | 12/2022 | Ling | H04W 72/1268 |

OTHER PUBLICATIONS

Huawei et al. "Beam Failure Recovery for SCell" R1-1903977, 3GPP TSG RAN WG1 Meeting #96bis, Apr. 8, 2019, 7 pages.

Avni, et al; "Synthesizing time-triggered schedules for switched networks with faulty links", 2016 International Conference on Embedded Software (EMSOFT). IEEE, Pittsburgh, PA, USA, Oct. 7, 2016, 10 pages.

* cited by examiner

SECONDARY CELL LINK RECOVERY REQUEST TRANSMISSION

PRIORITY INFORMATION

This application is a continuation of U.S. patent application Ser. No. 16/931,254, entitled "Secondary Cell Link Recovery Request Transmission," filed Jul. 16, 2020, which claims benefit of priority to Chinese Application No. 201910920468.5, titled "Secondary Cell Link Recovery Request Transmission", filed Sep. 27, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for secondary cell link recovery.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, a link between a secondary cell (SCell) and a UE may be lost. Recovering the SCell link may take time and/or conflict with other priorities. Thus, improvements in the field are desirable.

SUMMARY

Techniques, apparatuses, systems, and methods are disclosed for a user equipment device (UE) to recover a link with a secondary cell (SCell). In some embodiments, after detecting the SCell link failure, the UE may determine one or more conditions. Based on the one or more conditions, the UE may select time and frequency resources to transmit an indication of the SCell link failure to a network. Additionally, the UE may select an uplink and/or downlink beam to use prior to receiving a beam indication from the network.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
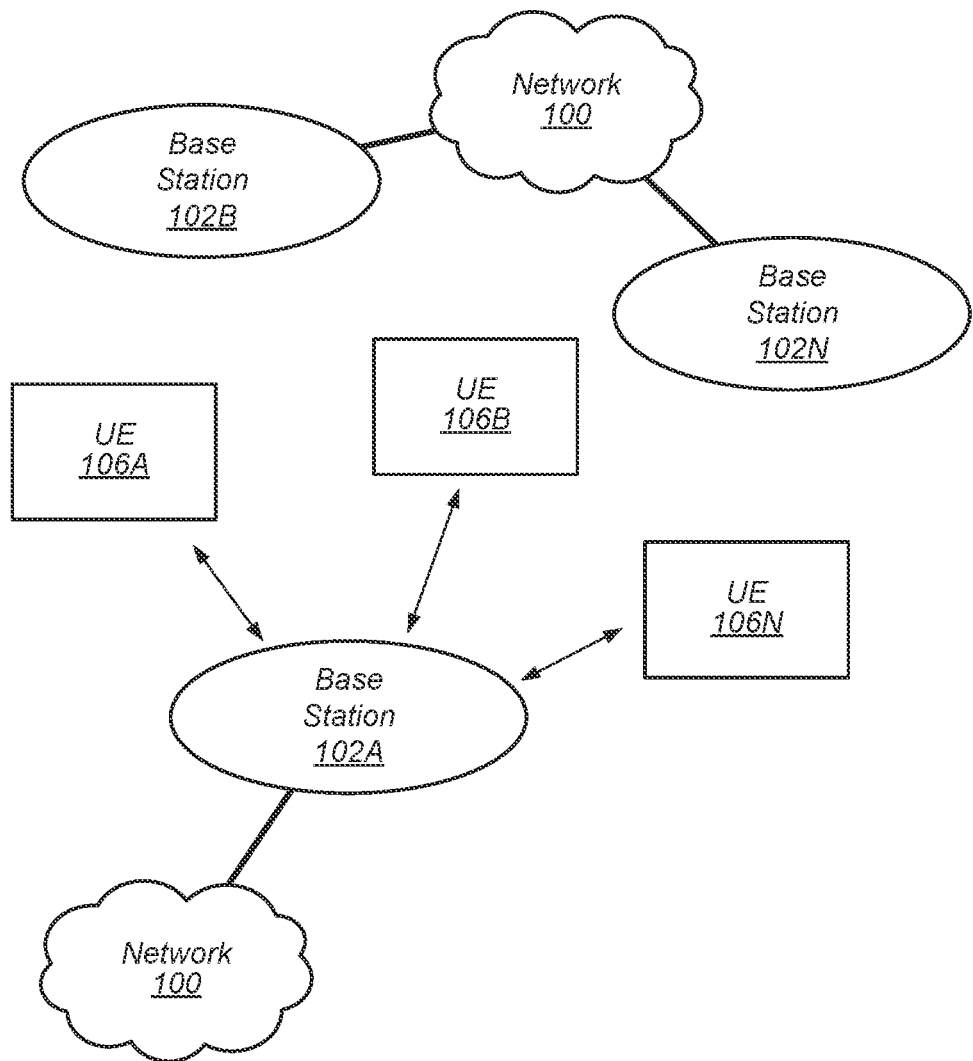
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:

UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched EPS: Evolved Packet-Switched System
RRC: Radio Resource Control
IE: Information Element

TERMS

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
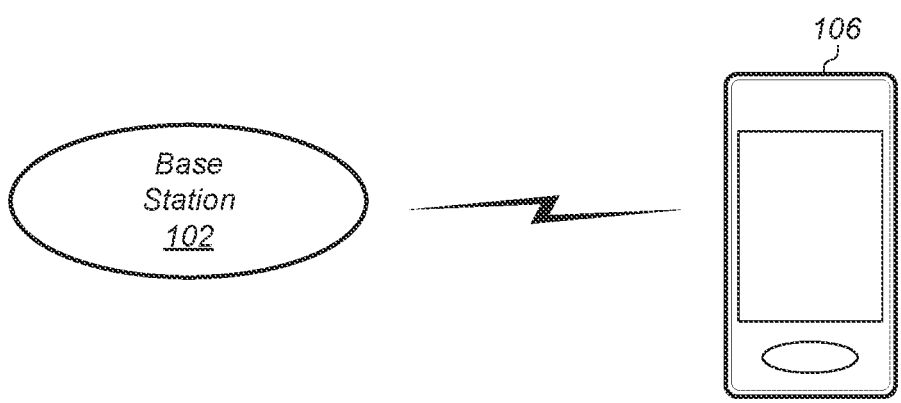
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
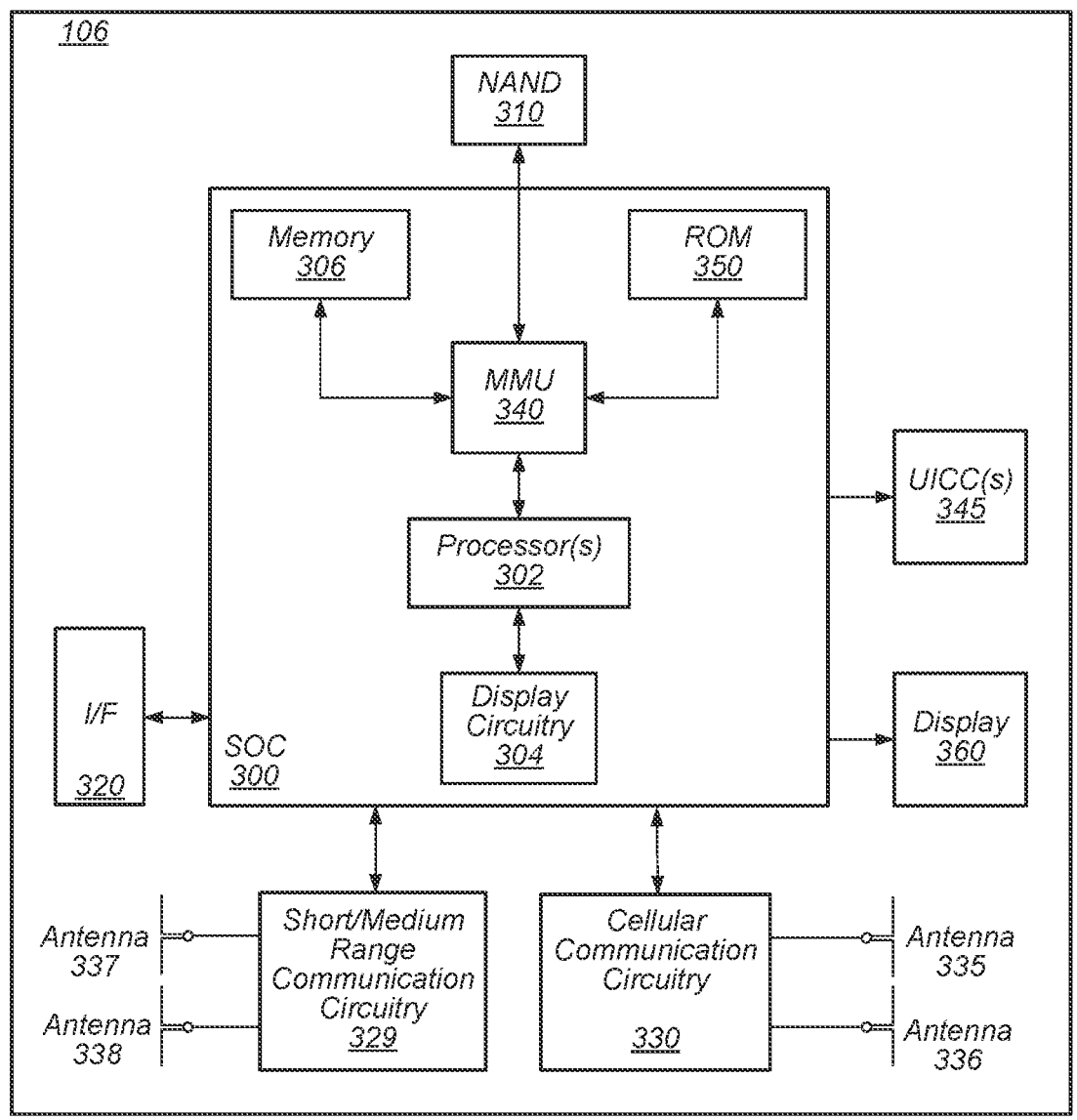
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
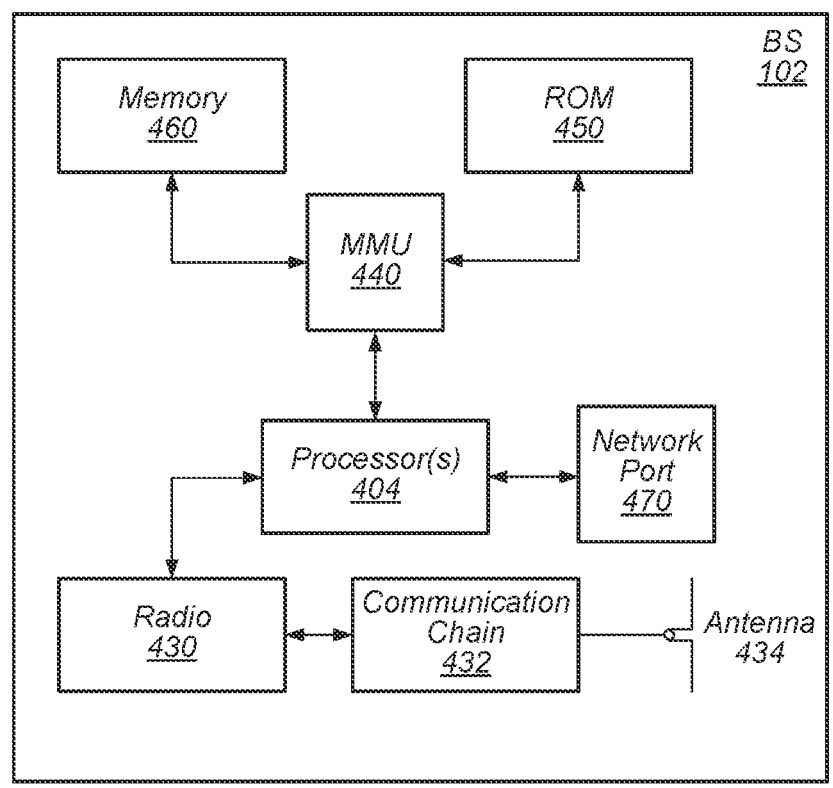
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
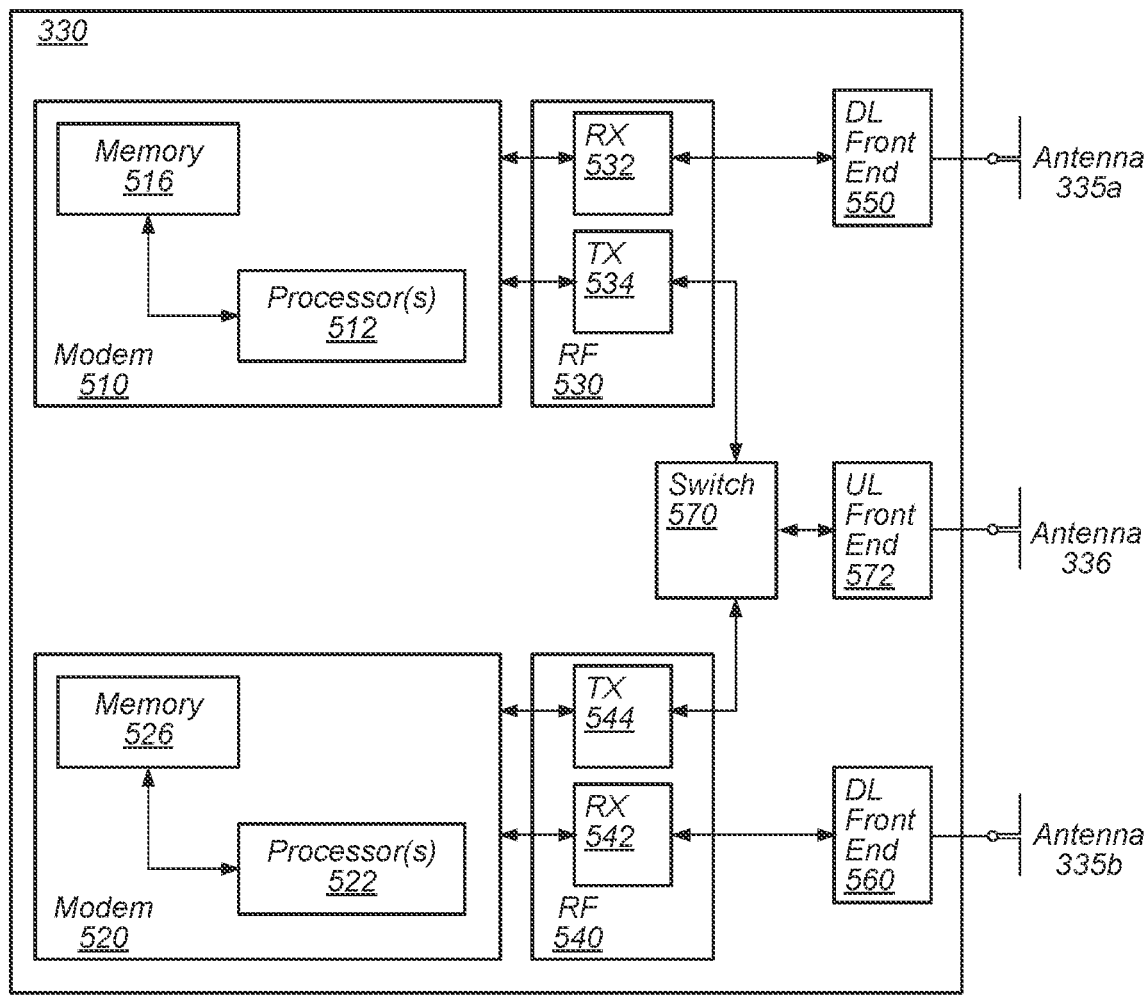
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
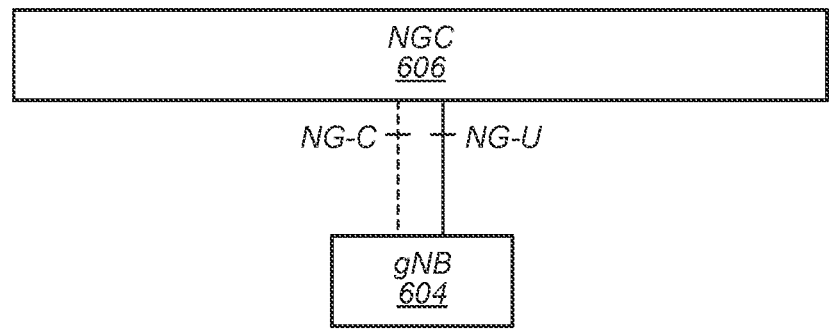
FIGS. 6 and 7 illustrate examples of a 5G NR base station (gNB), according to some embodiments.
Figure 7:
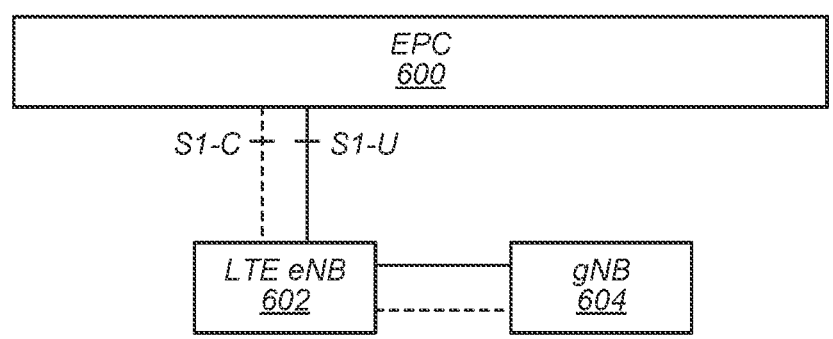

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Secondary Cell (SCell) Link Recovery

Modern wireless communication systems, e.g., cellular systems such as 5G NR, may allow for a UE to be connected to multiple cells simultaneously. For example, a UE may connect to a primary cell (PCell) and one or more secondary cell (SCells). The PCell may handle control communications between the network and the UE for the SCell(s). The PCell and SCell(s) may operate according to the same or different RATs. For example, the PCell may operate according to LTE and the SCell(s) may operate according to NR, or vice versa, among other possible combinations. The PCell and SCell(s) may be provided by the same or different BS 102.

Under some circumstances, a UE may lose (e.g., disconnect) a link with one or more cells. For example, a UE may declare link failure in response to one or more measurements of radio conditions for the link falling below one or more corresponding thresholds. The link failure may be a beam failure, e.g., the UE and BS may need to select new directional beams for uplink (UL) and/or downlink (DL) communications. For example, based on a change in orientation of the UE relative to the BS, the UE may need to use a different beam for transmitting and/or receiving. It will be appreciated that either or both of the UE and/or BS may need to update beam selection in response to a link failure. Similarly, it may be the case that a link failure may lead to the handover of the UE to one or more different cells.

Figure 8:
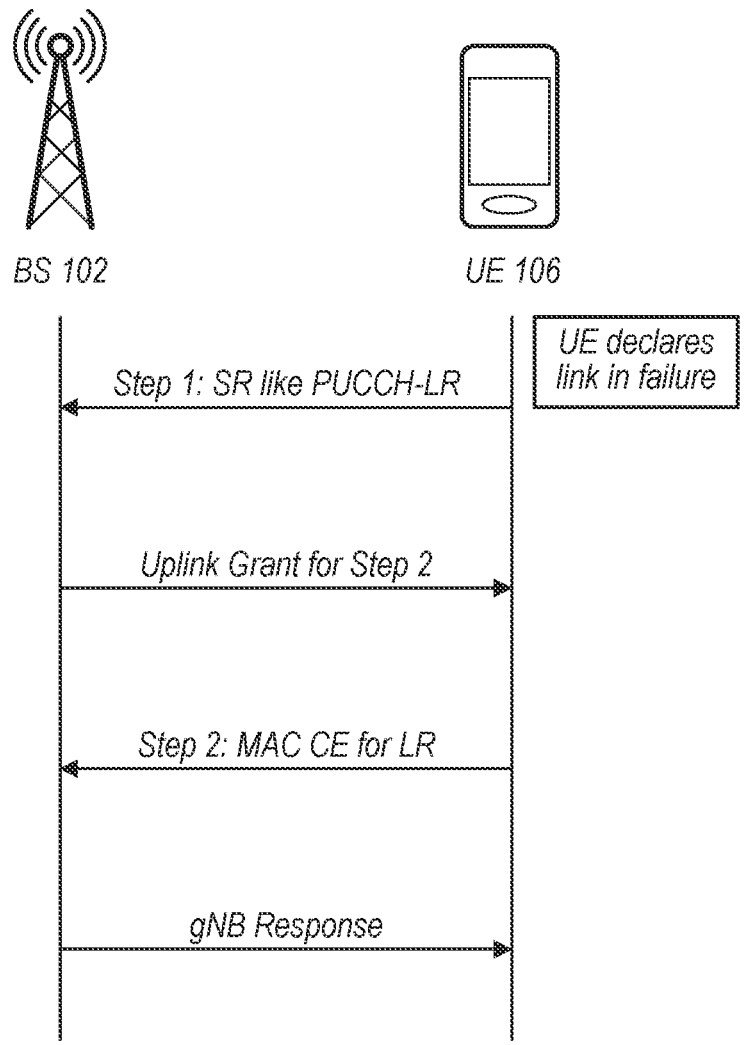
FIG. 8 is a communication diagram illustrating SCell link recovery messages, according to some embodiments.

In NR, it has been agreed that for SCell Link Recovery (LR), e.g., after a UE declares link failure of a link with an SCell, the UE would send a Link Recovery reQuest (LRQ) in two steps using a PCell, e.g., as illustrated in FIG. 8. In a first step, the UE may send a Scheduling Request (SR)-like message on a physical uplink control channel (PUCCH) for Link Recovery (LR) to tell the BS (e.g., gNB) of the beam (e.g., link) failure. The PUCCH-LR may be transmitted using scheduled time and frequency resources designated for this purpose. In some embodiments, the UE may determine opportunities to transmit an indication of link failure prior to such a PUCCH-LR opportunity. In some embodiments, a UE may use one or more approaches for resolving a conflict (e.g., collision) between a LR message and one or more other scheduled messages.

In a second step, the UE may report the failed serving cell index as well as a new beam index. In some embodiments, the UE may wish to perform one or more UL and/or DL communications prior to receiving an indication from the BS of which UL and/or DL beam should be used. The UE may use the beam indicated in the report of the second step prior to receiving such an indication from the BS.

Figure 9:
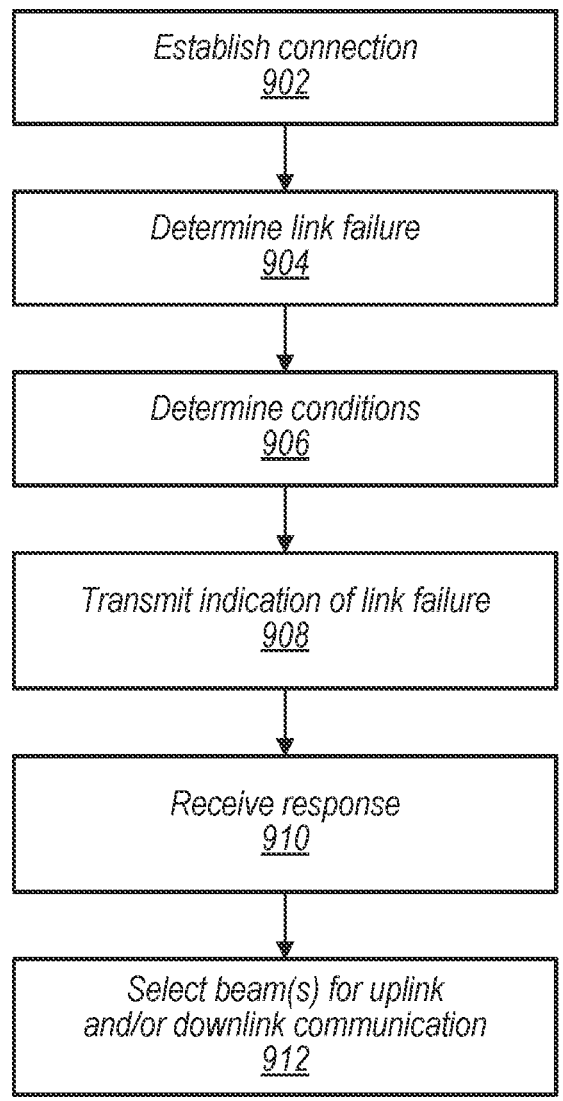
FIG. 9 is a flow chart diagram illustrating an example method for secondary cell (SCell) link recovery, according to some embodiments.

FIG. 9 is a flow diagram which illustrates exemplary aspects of LR messaging. The techniques of FIG. 9 may allow for a UE to transmit LR messages to the network efficiently and to select beams for communications prior to receiving a beam indication from the network. Aspects of the method of FIG. 9 may be implemented by a UE 106 in communication with a BS 102, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.) may cause the UE or base station(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish a connection with a BS 102 (902), according to some embodiments. The connection may be or include a cellular connection, e.g., operating according to one or more wireless standards. The connection may include links with a PCell and one or more SCell(s). The PCell and one or more SCell(s) may be provided by any number of BSs (e.g., one or more BS 102s). The UE and BS(s) may exchange data and/or control information, e.g., in the uplink (UL) and/or downlink (DL) directions. The PCell and SCell(s) may operate according to the same or different wireless standards. For example, one or more of the cells may operate according to LTE and/or NR, among various possibilities. For example, the PCell may use LTE and an SCell may use NR, or vice versa, or both the PCell and SCell may use NR, among various possibilities.

The UE and/or BS may take various measurements of the various links (e.g., of the PCell and/or SCell(s)). The measurements may include any radio link measurements such as signal-noise ratio (SNR), signal to interference and noise ratio (SINR), reference signal received power (RSRP), reference signal received quality (RSRQ), received signal strength indicator (RSSI), channel quality indicator (CQI), channel state information (CSI), block error rate (BLER), bit error rate (BER), channel impulse response (CIR), channel error response (CER), etc. The UE and/or BS may retain a history of measurement values. The UE/BS may compare the measurement values, or metrics calculated based on the measured values, to one or more thresholds. The UE/BS may use various parameters, e.g., for hysteresis, in such comparisons. The measurements, thresholds, and/or parameters may be configured by the BS (e.g., by the network) and/or by the UE. The UE and/or BS may report measurement values (e.g., directly and/or as channel quality indicator (CQI), channel state information (CSI), etc.), comparison results, etc. to each other and/or to the network at any time.

The UE 106 may determine link failure, e.g., of a link with an SCell (904), according to some embodiments. The link failure may be based on one or more measurements falling below corresponding thresholds, e.g., indicating that the link (e.g., the current beam of the link) has become unusable. For example, the link failure of the SCell may be a beam failure of the SCell. The UE 106 may or may not determine failure of other links (e.g., other SCells, PCell, etc.). For example, the link to the PCell may remain useable.

The UE 106 may determine conditions (906), according to some embodiments.

Figure 10:
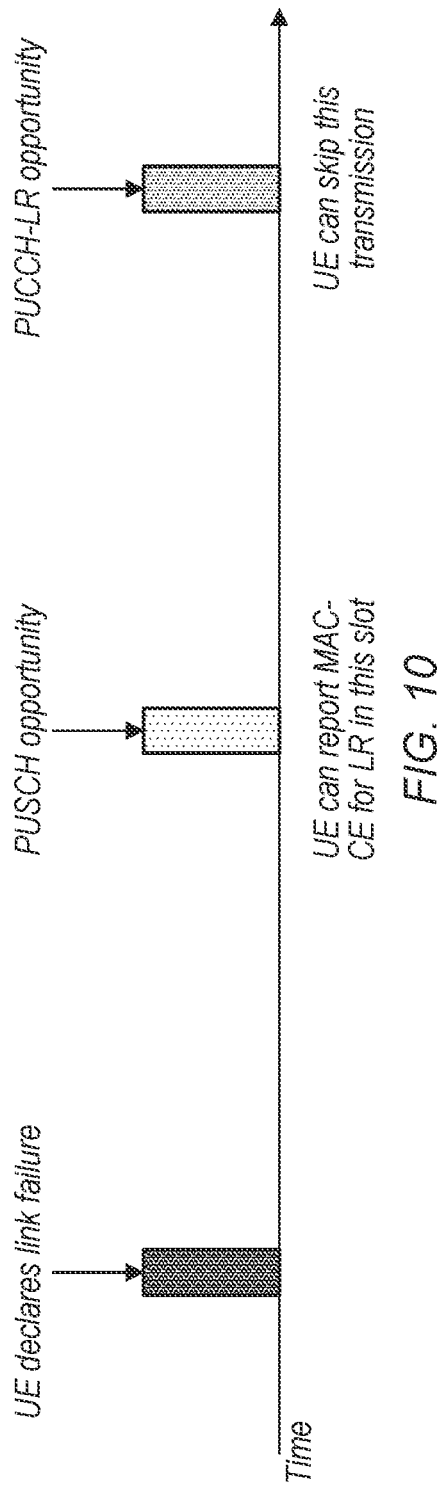
FIGS. 10 and 11 are timelines of SCell link recovery message opportunities, according to some embodiments.

As noted above, it may be beneficial for the UE to transmit an indication of the SCell link failure prior to (e.g., or more generally, outside of) a scheduled opportunity for transmitting a link recovery message (e.g., PUCCH-LR). This may allow the UE to skip the PUCCH-LR and to save overhead and reduce latency. For example, if the BS receives a media access control (MAC) control element (CE) for LR, the BS may identify a failed serving cell index (e.g., provided by the UE in the MAC CE and/or identifying the SCell with the link failure), so that it can identify the beam failure event. For example, as shown in FIG. 10, a UE may declare link failure at a first time, transmit a MAC CE for LR at a second time (e.g., a physical uplink shared channel (PUSCH) opportunity, among various possibilities), and at a third time skip a PUCCH-LR opportunity.

Figure 11:
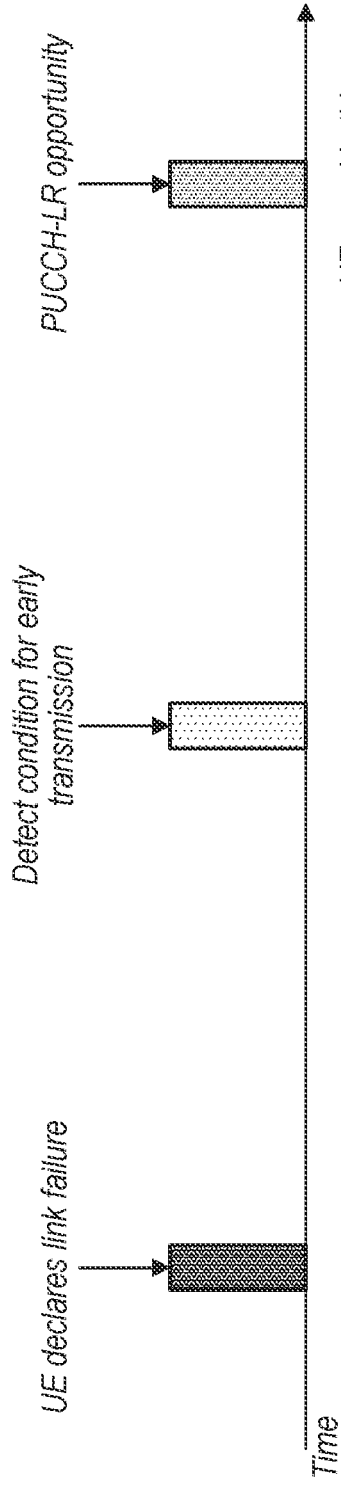

The UE may determine conditions under which it may perform an early transmission of a link failure indication, e.g., as shown in FIG. 11, according to some embodiments. For example, in response to detecting one or more of the following conditions, a UE may skip a PUCCH-LR transmission.

Condition 1: the UE may receive a UL grant after it declares link failure and before the next opportunity of PUCCH-LR. Thus, the UE may determine to transmit an indication of link failure on the resources (e.g., PUCCH and/or PUSCH resources) allocated by the UL grant. The resources allocated by the UL grant may be before or concurrent with the next opportunity of PUCCH-LR. In some embodiments, the resources configured by the UL grant may be after the next opportunity of PUCCH-LR.

Condition 2: the UE may be configured with a configured-grant based transmission, e.g., for PUSCH and/or PUCCH resources. For example, the configured-grant may allocate resources for periodic and/or ongoing transmissions such as channel state information (CSI). A portion of the resources allocated by the configured grant may be before or concurrent with the next opportunity of PUCCH-LR. In some embodiments, the portion of the resources allocated by the configured grant may be after the next opportunity of PUCCH-LR.

Condition 3: the UE may be configured with a 2-step random access channel (RACH) process. For example, the UE may determine that an opportunity to perform 2-step random access (e.g., RACH) may be available. The 2-step RACH opportunity may be before or concurrent with the next opportunity of PUCCH-LR. In some embodiments, the 2-step RACH opportunity may be after the next opportunity of PUCCH-LR. Thus, the random access request may be used to indicate the link failure of the SCell.

In some embodiments, an additional condition for conditions 2 and/or 3 could be that the resources allocated by the configured grant or designated for the 2-step RACH opportunity occur prior to a next opportunity specifically configured for link recovery messages (e.g., a PUCCH-LR opportunity). For example, an additional condition may be that there is one PUSCH opportunity for the configured grant or UL grant after UE declares beam failure and before the next opportunity for PUCCH-LR. In other words, early transmission and skipping of the PUCCH-LR opportunity may only be implemented if the PUSCH opportunity or 2-step RACH opportunity is not later than the next opportunity for PUCCH-LR.

In some embodiments, even if one or more of conditions 1-3 are true, the UE may select not to perform early transmission, and may instead wait for the PUCCH-LR opportunity. Among other possibilities, the UE may select to wait for the PUCCH-LR opportunity if a periodicity of a configured grant (e.g., in context of condition 2) is sufficiently long (e.g., if skipping the intended transmission of the configured grant may result in a long delay and frustration of that purpose).

In various embodiments, an opportunity for transmitting a link failure indication (e.g., based on any of conditions 1-3) may be on any of various cells. In some embodiments, the conditions 1-3 may be further limited based on the type and/or identity of the cell on which the opportunity is found. In some embodiments, the conditions 1-3 may be limited to the case that the serving cell (e.g., the cell on which the opportunity to transmit the link failure indication exists) is the same as the cell on which the PUCCH-LR opportunity exists. In some embodiments, the conditions 1-3 may be limited to the case that the serving cell is the same as the cell on which the PUCCH-LR opportunity exists or any other serving cell (e.g., the PCell or any SCell). In some embodiments, the conditions 1-3 may be limited to the case that the serving cell is the same as the cell on which the PUCCH-LR opportunity exists or another serving cell excluding the failed serving cell (e.g., the PCell or any SCell other than the SCell on which the link failure occurred).

Figure 12:
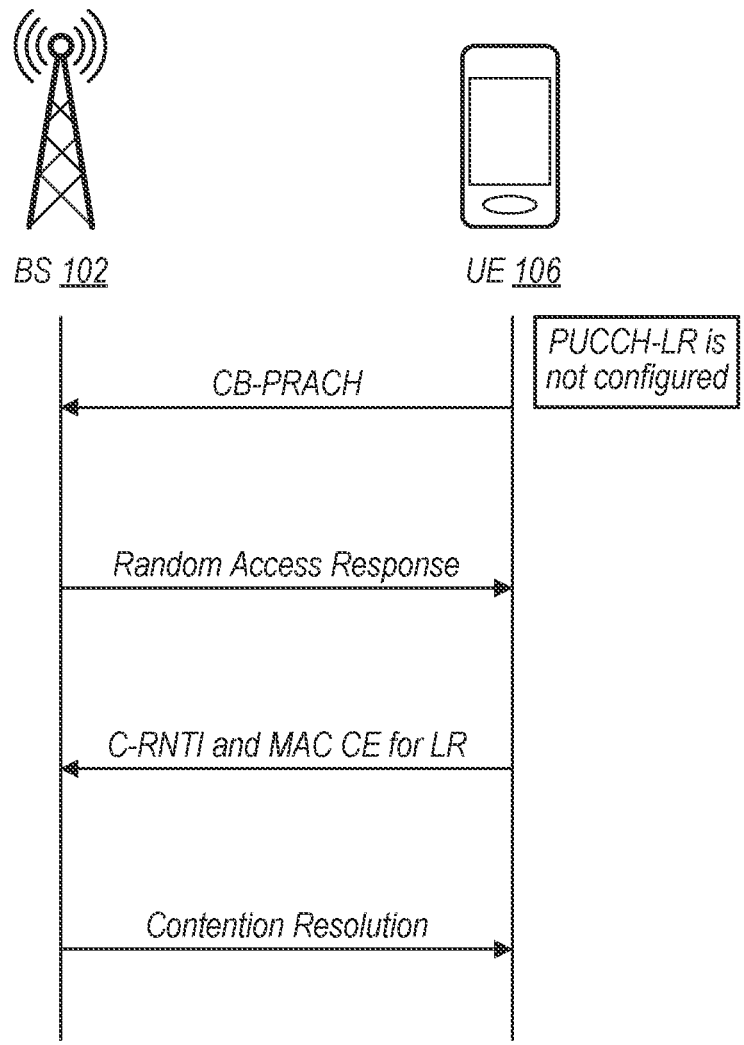
FIG. 12 is a communication diagram illustrating SCell link recovery messages using random access, according to some embodiments.

In some embodiments, the UE may detect that it is not configured for any PUCCH-LR resource (e.g., a fourth condition). Accordingly, the UE may fallback to use contention based PRACH to request resources for transmitting a MAC CE for LR, e.g., as shown in FIG. 12 according to some embodiments. In response to detecting the link failure of an SCell and further determining that the UE is not configured with a PUCCH-LR opportunity (e.g., at all, or within a threshold amount of time), the UE may transmit a contention based (CB) PRACH to the network. The CB PRACH may be transmitted on the PCell, on the SCell where the link failure occurred, or on another SCell, among various possibilities. The network may transmit a random access response (RAR). The RAR may include a cell radio network temporary identifier (C-RNTI). In response to the RAR, the UE may transmit a MAC CE for LR, e.g., using the C-RNTI. In response to the MAC CE, the network may transmit a contention resolution to the UE. The contention resolution may indicate a new beam (or beams) for UL and/or DL communications on the failed SCell. The contention resolution may also include one or more UL and/or DL grants.

Figure 13:
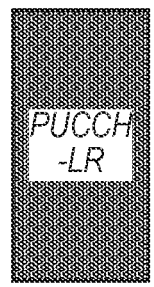
FIG. 13 illustrates potential collisions with SCell link recovery messages, according to some embodiments.
Figure 13:
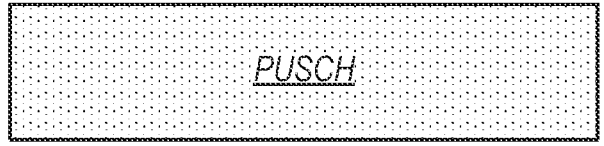
Figure 13:

In some embodiments, the UE may detect one or more collisions or conflicts with PUCCH-LR and one or more other UL transmissions (e.g., or configured transmission opportunities). As illustrated in FIG. 13, such collisions may include UL transmissions using any of various transmission (Tx) beams on any of various cells, according to some embodiments. Accordingly, the UE may determine conditions to inform a decision of how to transmit PUCCH-LR when it is collided with other signals in the same cell or different cells. For example, a UE may be able to use only one Tx beam to transmit a UL signal in a transmission occasion, therefore may need to determine how to handle the case when PUCCH-LR and other signals with different beams are multiplexed (e.g., in frequency division multiplexing (FDM)). For example, in the illustrated case, the UE may need to select one of the PUCCH-LR using Tx beam 1 on the PCell, PUSCH using Tx beam 2 on a first SCell, or SRS using Tx beam 3 on a second SCell. In other words, when PUCCH-LR collides with one or more other UL signal, the UE may use a priority rule to determine which signal to drop. For example, based on the priority rule, the UE may determine to transmit either the PUCCH-LR or the other UL signal, but not both (at least not at the time of the collision). Accordingly, in order to implement such a priority rule, the UE may determine what (e.g., if any) other UL transmission collides with the PUCCH-LR opportunity and on what cell or cells the other transmission is configured.

In an example in which the PUCCH-LR collides with another UL signal on a different serving cell an example priority rule may be expressed as: PRACH is higher priority than PUCCH-LR, PUCCH-LR may be higher priority than other PUCCH communications, which may be higher priority than reference signal (e.g., sounding reference signal (SRS)). In other words: PRACH>PUCCH-LR>PUCCH for any other purposes (e.g., such as scheduling request (SR), hybrid acknowledgement request (HARQ) acknowledgment (ACK), CSI, etc.)>SRS. It will be appreciated that this priority rule is exemplary only, and that other priority rules may be used as desired.

In an example in which the PUCCH-LR collides with another uplink signal in the same serving cell, the following priority rules may be used, among various possibilities. In a first case that the PUCCH-LR collides with PRACH, the UE may transmit PRACH. In some embodiments, in the first case, the UE may determine to transmit PUCCH-LR, e.g., according to an alternative priority rule. In a second case that the PUCCH-LR collides with PUSCH, the UE may transmit MAC CE for LR using the PUSCH resources, e.g., and may skip transmission of PUCCH-LR. In a third case that the PUCCH-LR collides with PUCCH for another purpose, the UE may drop the other PUCCH in order to transmit the PUCCH-LR. It will be appreciated that other priority rules may be used as desired. In some embodiments, if other resources for indicating link failure are available (e.g., according to conditions 1-3, discussed above), then the PUCCH-LR may be considered low priority, and any of the above example priority rules may be modified to reduce the priority of PUCCH-LR, e.g., relative to colliding transmission types.

The UE 106 may transmit an indication of link failure the BS 102 (908), according to some embodiments. The indication of link failure may be transmitted on time and frequency resources selected based on the conditions and priority rules described above (e.g., with respect to 906). For example, if any of conditions 1-3 apply, the UE may transmit the indication of link failure on resources available prior to PUCCH-LR resources and may skip transmission of the PUCCH-LR, among various possibilities. As another example, (e.g., if no previous transmit opportunities are identified), the UE may determine to transmit PUCCH-LR instead of transmitting a lower priority UL transmission that collides with the PUCCH-LR transmission opportunity.

In some embodiments, the indication of link failure may include a recommended UL and/or DL beam, e.g., for further communication with the SCell on which link failure occurred. Such a recommended UL and/or DL beam may be determined based on measurements of one or more beams, based on motion of the UE, and/or other factors.

The network may transmit and the UE may receive a response to the indication of link failure (910), according to some embodiments. The response may be or include an acknowledgement (ACK). The response may include UL and/or DL resource assignments, e.g., for the SCell on which the link failure occurred and/or other cells. The response may be transmitted on the PCell, among various possibilities. In some embodiments, the response may not include an indication of a selected UL and/or DL beam for use with the failed serving cell (e.g., the SCell on which link failure occurred). In other words, the response may not respond to any indication of a suggested beam that the UE included in an indication of link failure (e.g., in 908).

Figure 14:
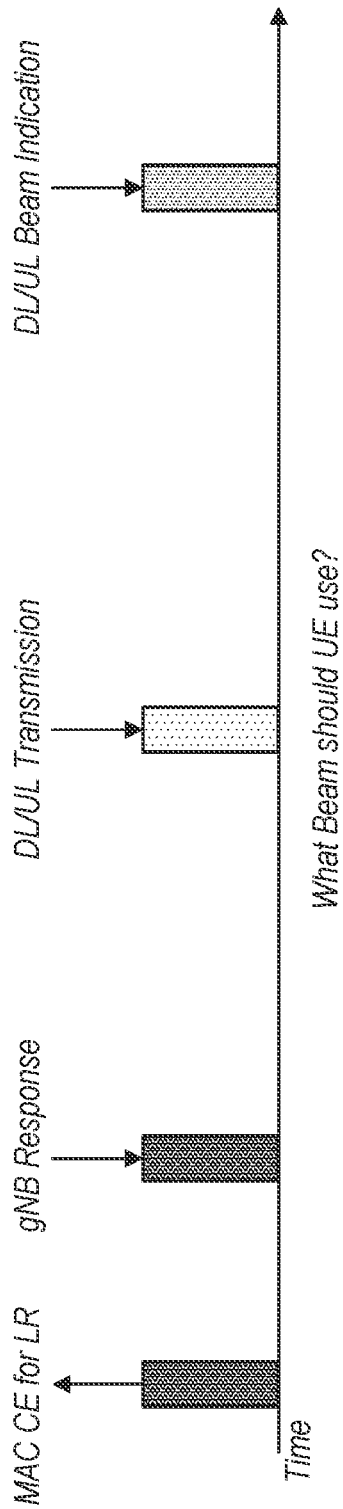
FIG. 14 is a timeline of SCell link recovery messages and beam selection, according to some embodiments.

The UE 106 may select a beam or beams for UL and/or DL communication with the BS 102, e.g., for communication on the SCell on which link failure occurred (912), according to some embodiments. In some embodiments, such a selection may occur without (e.g., prior to) receiving an indication from the network of what beam to use subsequent to the link failure, e.g., as shown in FIG. 14. Selecting a beam without waiting for an indication of a beam selected by the network may allow for the UE to proceed with communications with less latency (e.g., without waiting to receive an indication of the network's selected beam). As shown, the UE may transmit an indication of the link failure (e.g., a MAC CE for LR, among various possibilities) (e.g., as in 908) and may receive a response from the network (e.g., as in 910). Based on the response (e.g., and/or based on a UL/DL grant, configured grant, etc.), the UE may determine that a UL and/or DL transmission is scheduled, on the SCell on which the link failure occurred, prior to receiving any UL and/or DL beam indication from the network for the SCell on which the link failure occurred. Accordingly, the UE may select a UL and/or DL beam prior to receiving such an indication. In other words, the UE may make a quasi co-location (QCL) assumption for a DL signal and/or a spatial relation information assumption for an UL channel after transmitting the link failure indication and receiving a response. For example, when LR is finished successfully, the previous beam (e.g., on which the link failure occurred) may not be qualified for communication (e.g., due to the beam/link failure). Accordingly, the UE may assume that a beam recommended in the UE's indication of link failure (e.g., in 908) may be used if at least a threshold amount of time has passed since a response (e.g., in 910) to the link failure indication. The threshold amount of time may be expressed as a number of slots, K. For example, K or more slots after receiving the response to a MAC CE for LR and before beam indication for corresponding channel (e.g., beam), the UE use a beam (e.g., or respective UL and DL beams, if identified separately) identified in the indication of link failure to transmit any UL channel and/or receive any DL channel on the SCell on which link failure occurred.

The UL channel/transmission(s) could include PUCCH, and/or SRS, and/or PUSCH, among various possibilities. The DL channel/transmissions could include PDCCH, and/or PDSCH, among various possibilities. In some embodiments, the UE may apply this assumption that the indicated beam(s) will be used only for UL and/or DL channel(s) in the failed serving cell (e.g., only on the SCell on which the link failure occurred). In other embodiments, the UE may use this assumption for UL and/or DL channel(s) in all serving cells in the same band as the failed serving cell (e.g., potentially including the PCell and/or one or more additional SCells). Thus, the UE may use the suggested (e.g., assumed) UL and/or DL beam to proceed with further communication to/from the failed serving cell (e.g., and/or other cells) without delay.

In some embodiments, K may be based on a UE capability, e.g., a minimum amount of time in which the UE can change from one beam to another. In some embodiments, K may be configured by the network, e.g., using radio resource control (RRC) signaling. In some embodiments, K may be predefined, e.g., by a standards document, e.g. K=4, among various possibilities.

In some embodiments, the UE may further receive an indication from the network of a UL and/or DL beam, selected by the network, to use with the SCell on which link failure occurred (e.g., and potentially all serving cells in the same band as the failed serving cell). The UL and/or DL beam, selected by the network, may be the same or different than the beam(s) suggested by the UE (e.g., in 908). Accordingly, if the beam(s) are different than the beam(s) suggested (e.g., in 908) and used (e.g., in 912), the UE may switch to the beam(s) selected by the network (e.g., for further UL and/or DL communications with the failed serving SCell and/or other serving cells operating in the same band as the failed serving cell).

ADDITIONAL INFORMATION AND EXAMPLES

In some embodiments, the techniques of FIG. 9 may be used to handle failures of multiple SCells at the same or similar times. For example, an indication of link failure may identify multiple SCells, e.g., by their respective cell indexes. Similarly, transmissions to/from multiple SCells may use beams indicated in a beam indication transmitted to the network prior to receiving a corresponding beam indication from the network.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a base station of a cellular network to:
establish a connection with a user equipment (UE), wherein the connection includes:
a link with a primary cell (PCell); and
a link with a secondary cell (SCell);
transmit, to the UE, configuration for a first opportunity for transmission of a link recovery message on a physical uplink control channel (PUCCH); and
receive, from the UE on a physical uplink shared channel (PUSCH), an indication of a failure of the link with the SCell, wherein the indication is received on the PUSCH prior to a start of the first opportunity for transmission of the link recovery message on the PUCCH, wherein the indication is received using a medium access control (MAC) control element (MAC CE).

2. The apparatus of claim 1, wherein the indication of the failure of the link with the SCell includes an indication of a suggested beam for further communications with the SCell.

3. The apparatus of claim 2, wherein the processor is further configured to cause the base station to:
transmit, to the UE, a response to the indication of the failure of the link with the SCell including a selected beam for further communications with the SCell different than the suggested beam.

4. The apparatus of claim 3, wherein the processor is further configured to cause the base station to:
perform a first further communication with the UE via the SCell using the suggested beam prior to transmitting the response.

5. The apparatus of claim 4, wherein the first further communication occurs at least K slots after the response to the indication of the failure of the link with the SCell.

6. The apparatus of claim 5, wherein K is based on an indication transmitted to the UE via radio resource control signaling.

7. The apparatus of claim 5, wherein K is based on a capability of the UE.

8. The apparatus of claim 2, wherein the processor is further configured to cause the base station to:
transmit, to the UE, a response to the indication of the failure of the link with the SCell including a selected beam for further communications with the SCell that is the suggested beam.

9. The apparatus of claim 2, wherein the suggested beam is used for communication with the UE by all serving cells operating in a same band as the SCell.

10. A base station, comprising:
a radio; and
a processor operably coupled to the radio and configured to cause the base station to:
establish a connection with a user equipment (UE), wherein the connection includes:
a link with a primary cell (PCell); and
a link with a secondary cell (SCell);
transmit, to the UE, configuration for a first opportunity for transmission of a link recovery message on a physical uplink control channel (PUCCH); and
receive, from the UE on a physical uplink shared channel (PUSCH), an indication of a failure of the link with the SCell, wherein the indication is received on the PUSCH prior to and outside of the first opportunity for transmission of the link recovery message on the PUCCH, wherein the indication is received using a medium access control (MAC) control element (MAC CE).

11. The base station of claim 10, wherein the indication of the failure of the link with the SCell includes an indication of a suggested beam for further communications with the SCell.

12. The base station of claim 11, wherein the processor is further configured to cause the base station to:
transmit, to the UE, a response to the indication of the failure of the link with the SCell including a selected beam for further communications with the SCell different than the suggested beam.

13. The base station of claim 12, wherein the processor is further configured to cause the base station to:
perform a first further communication with the UE via the SCell using the suggested beam prior to transmitting the response.

14. The base station of claim 13, wherein the first further communication occurs at least K slots after the response to the indication of the failure of the link with the SCell.

15. The base station of claim 14, wherein K is based on an indication transmitted to the UE via radio resource control signaling.

16. The base station of claim 14, wherein K is based on a capability of the UE.

17. The base station of claim 11, wherein the processor is further configured to cause the base station to:
transmit, to the UE, a response to the indication of the failure of the link with the SCell including a selected beam for further communications with the SCell that is the suggested beam.

18. The base station of claim 11, wherein the suggested beam is used for communication with the UE by all serving cells operating in a same band as the SCell.

19. A method, comprising:
at a base station:
establishing a connection with a user equipment (UE), wherein the connection includes:
a link with a primary cell (PCell); and
a link with a secondary cell (SCell);
transmitting, to the UE, configuration for a first opportunity for transmission of a link recovery message on a physical uplink control channel (PUCCH); and receiving, from the UE on a physical uplink shared channel (PUSCH), an indication of a failure of the link with the SCell, wherein the indication is received on the PUSCH prior to a start of the first opportunity for transmission of the link recovery message on the PUCCH, wherein the indication is received using a medium access control (MAC) control element (MAC CE).

20. The method of claim 19, wherein the indication of the failure of the link with the SCell includes an indication of a suggested beam for further communications with the SCell.

* * * * *